(12) United States Patent
Ellis, III et al.

(10) Patent No.: US 9,714,346 B1
(45) Date of Patent: Jul. 25, 2017

(54) TRIARYLMETHANE DYE-OXIMATE COMPOUNDS

(71) Applicant: TDA Research, Inc, Wheat Ridge, CO (US)

(72) Inventors: William Wallace Ellis, III, Louisville, CO (US); Brian John Elliott, Superior, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 0 days.

(21) Appl. No.: 15/268,122

(22) Filed: Sep. 16, 2016

(51) Int. Cl.
 *C09B 11/20* (2006.01)
(52) U.S. Cl.
 CPC .................................. *C09B 11/20* (2013.01)
(58) Field of Classification Search
 CPC .... C07C 239/20; G01N 31/00; G01N 31/224; G01N 31/223; G01N 33/00; G01N 33/0004
 See application file for complete search history.

(56) References Cited

U.S. PATENT DOCUMENTS

| 7,674,627 B2 | 3/2010 | Corcoran et al. |
| 2009/0187060 A1 | 7/2009 | Henry et al. |

OTHER PUBLICATIONS

Masui et al, Tetrahedron Letters, Stereoselective Synthesis of 1,2-Amino Alcohols by Asymmetric Borane Reduction of alpha-Oxoketoxime Ethers, 1998, 39, pp. 5195-5198.*
Dale and Rebek Jr.; Angew. Chem. Int. Ed.; 2009, 48, 7850-7852.

* cited by examiner

*Primary Examiner* — Paul A Zucker
(74) *Attorney, Agent, or Firm* — Brian J. Elliott

(57) ABSTRACT

A triarylmethane dye-oximate compound derived from 2,3-butanedione monoxime reacted with a triarylmethane dye. Particular embodiments include a triarylmethane dye selected from methyl violet, crystal violet, fuchsine, pararosaniline, new fuchsine, fuchsine acid, phenol red, malachite green, brilliant green, brilliant blue, Victoria blue B Victoria blue FBR, Victoria blue BO, Victoria blue FGA, Victoria blue 4 R, Victoria blue R or methyl blue. The dye-oximate compound is suitable for use as both a reactive decontaminating compound and a color indicating compound for organophosphates.

2 Claims, 6 Drawing Sheets

(4 of 6 Drawing Sheet(s) Filed in Color)

TRIARYLMETHANE DYE-OXIMATE COMPOUNDS

STATEMENT REGARDING U.S. GOVERNMENT SUPPORT

This invention was made in part using U.S. government funding through the U.S. Army Research Office contract W911NF-14-P-0066. The government has certain rights in this invention.

FIELD OF THE INVENTION

The present invention relates generally to chemical compounds that are for both neutralizing and visually reporting the presence of nerve agents and toxic industrial chemicals.

BACKGROUND OF THE INVENTION

The risk of exposure to nerve agents is an increasing concern for military personnel as well as civilians. In response to this threat, various countermeasures have been developed that are capable of neutralizing chemical weapons including nerve agents. Some compounds have also been developed that can report the presence of the nerve agent. For example colored compounds may change colors, or may have a change in their electromagnetic spectrum absorbance or fluorescence that can be measured using an analytical instrument such as a spectrometer.

Henry et al. [US 2009/0187060 A1] discloses 2,3-butanedione monoxime (also known as diacetyl monoxime), and alkali salts thereof such as potassium 2,3-butanedione monoximate (KBDO) that are suitable for neutralizing toxic chemicals including organophosphates.

Formula 1, Potassium 2,3-butanedione monoximate:

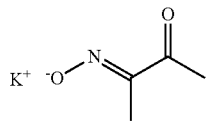

The following scheme (Scheme 1) shows the reaction of KBDO with the organophosphorus chemical agent VX.

Scheme 1

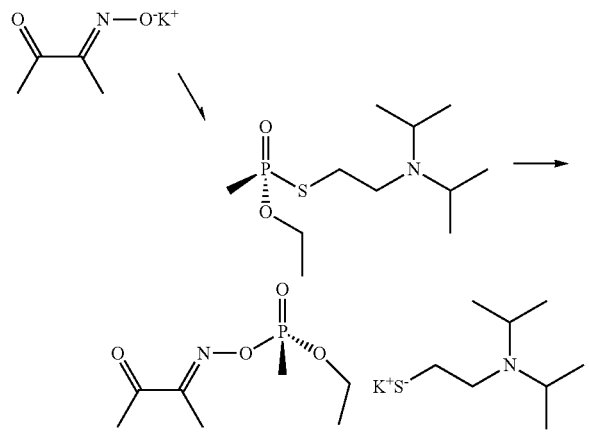

Hydroxy oximes have been used as organophosphorus nerve agent sensors [Dale and Rebek Jr., Angew. Chem. Int. Ed. 2009, 48, 7850-7852]. In these compounds aromatic cores are inserted between an oxime and a hydroxy group. When the oxime reacts with an organophosphorus compound there is a shift in the absorbance and/or fluorescence of the compound. This shift in light absorbance or emission properties is measured using a spectrometer and can be used to detect the presence of the organophosphorus compounds.

Formula 2, an example of a hydroxy oxime of Dale et al.:

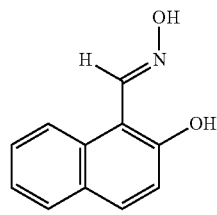 [SMILES: O/N=C/c1c(O)ccc2ccccc12]

Scheme 2 shows the reaction of the ortho-hydroxy oxime of Dale et al. with an organophosphorus compound.

Scheme 2

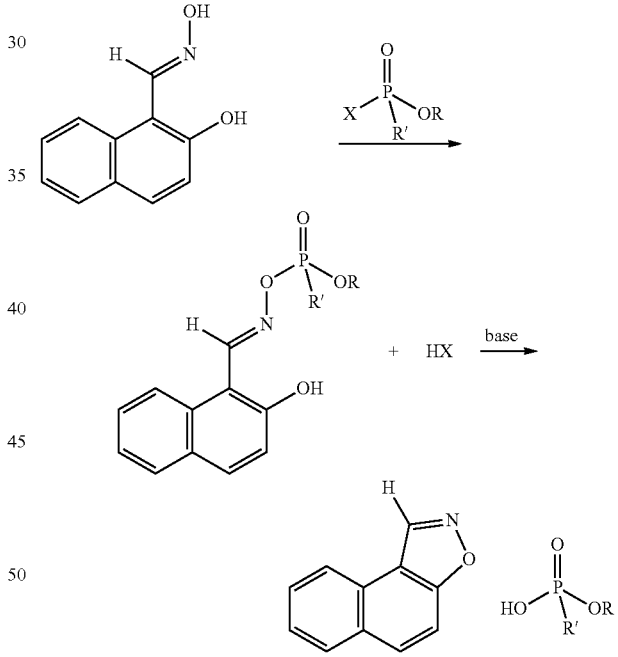

Another family of compounds has been used for detecting nerve agents, as disclosed by Corcoran et al. [U.S. Pat. No. 7,674,627 B2]. The sensing compounds have an alpha effect nucleophile group that undergoes specific nucleophilic substitution and rearrangement reactions with phosphorous-based nerve agents. This family of compounds has a reporter group covalently linked to an alpha effect nucleophile group. When these compounds react with phosphorous-based nerve agents, they chemically rearrange and release a new optically active compound (for example Malachite green). The color can be detected by a spectrometer or in some cases by the human eye (visual inspection).

Formula 3, example of a sensor compounds of Corcoran et al.:

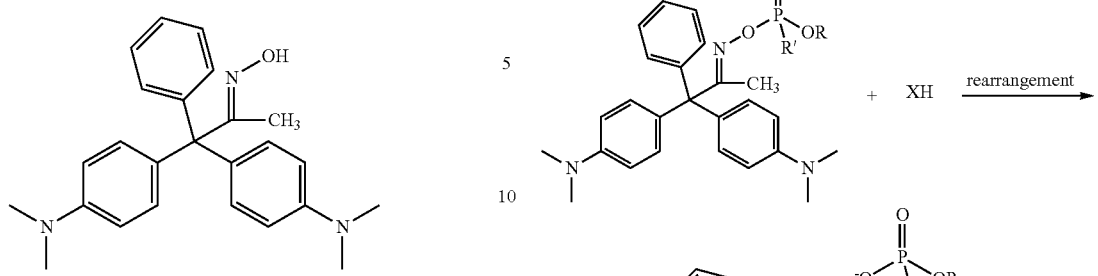

The sensor compounds of Corcoran may be produced from a triarylmethane dye, such as Malachite green, by reaction with NaCN followed by MeMgBr and $H_2NOH$ with catalysts as shown in Scheme 3.

Scheme 3

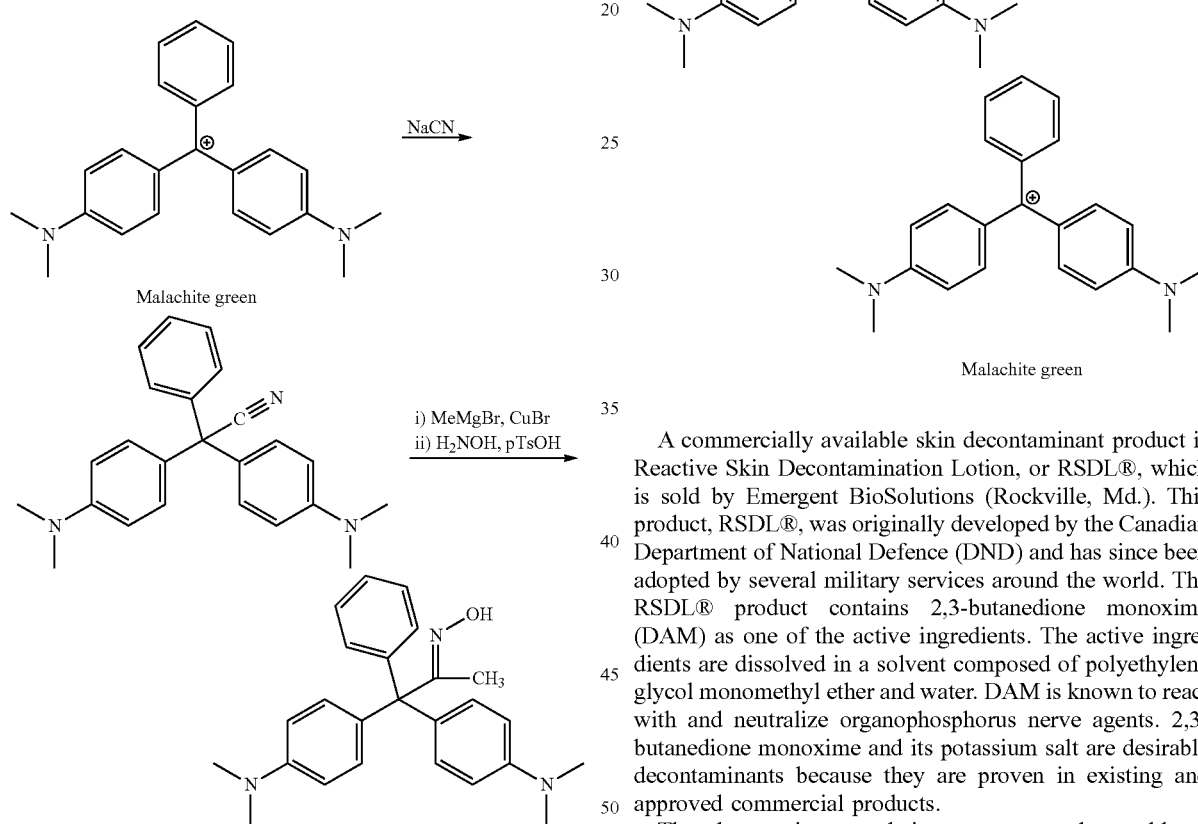

Scheme 4 shows an example of a sensor compound of Corcoran et al. reacting with an organophosphorus compound.

Scheme 4

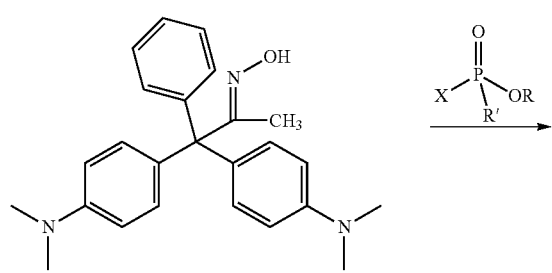

A commercially available skin decontaminant product is Reactive Skin Decontamination Lotion, or RSDL®, which is sold by Emergent BioSolutions (Rockville, Md.). This product, RSDL®, was originally developed by the Canadian Department of National Defence (DND) and has since been adopted by several military services around the world. The RSDL® product contains 2,3-butanedione monoxime (DAM) as one of the active ingredients. The active ingredients are dissolved in a solvent composed of polyethylene glycol monomethyl ether and water. DAM is known to react with and neutralize organophosphorus nerve agents. 2,3-butanedione monoxime and its potassium salt are desirable decontaminants because they are proven in existing and approved commercial products.

The above prior art relating to compounds capable of decontaminating and/or reporting the presence of an organophosphorus chemical agent suffer from at least one of the following limitations: they only decontaminate or neutralize the organophosphorus chemical agent (no color change); they exhibit a change in color that is subtle and requires a spectrophotometer to detect or to quantify the change; or the compound does not combine the preferred 2,3-butanedione monoxime or 2,3-butanedione monoximate with a dye compound to provide both the preferred neutralizing agent and a color-indicating feature.

SUMMARY OF THE INVENTION

The present invention solves the limitations of the prior art by providing chemical compounds that both contain the preferred neutralizing agent (2,3-butanedione monoximate)

and also provide a visual reporting (a dramatic color change) in the presence of organophosphorus nerve agents and other toxic organophosphorus compounds.

The invention is a triarylmethane dye-oximate compound having the chemical structure in Formula 4.

Formula 4, structure of the dye-oximate compounds:

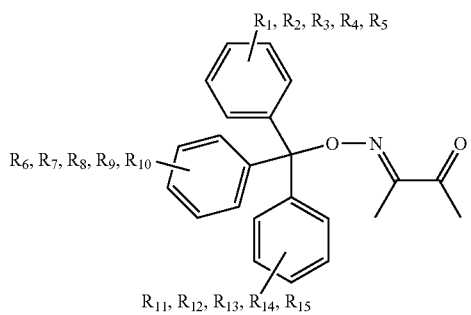

wherein, $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$ and $R_{15}$ each independent from one another are selected from the group consisting of —H, —N(Me)$_2$, —NH$_2$, —NH(Me), —SO$_3$Na, —SO$_3$, —CH$_3$, —OH, —N(C$_2$H$_5$)$_2$, —N(CH$_2$H$_5$)(CH$_2$C$_6$H$_4$SO$_3$) and —C$_4$H$_4$—. In preferred embodiments, the triarylmethane dye is either methyl violet, crystal violet, fuchsine, pararosaniline, new fuchsine, fuchsine acid, phenol red, Malachite green, brilliant green, brilliant blue, Victoria blue B Victoria blue FBR, Victoria blue BO, Victoria blue FGA, Victoria blue 4 R, Victoria blue R and methyl blue.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
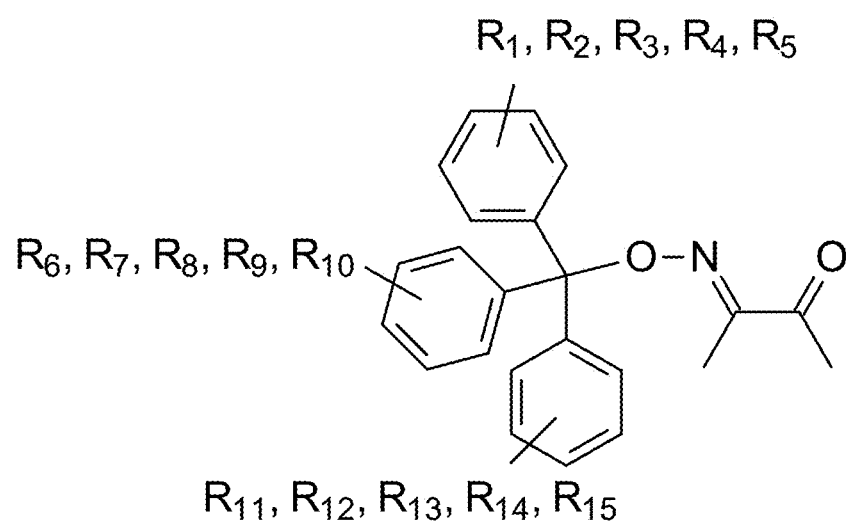
FIG. 1. Chemical structure of the triarylmethane dye-oximate compounds.
Figure 2:
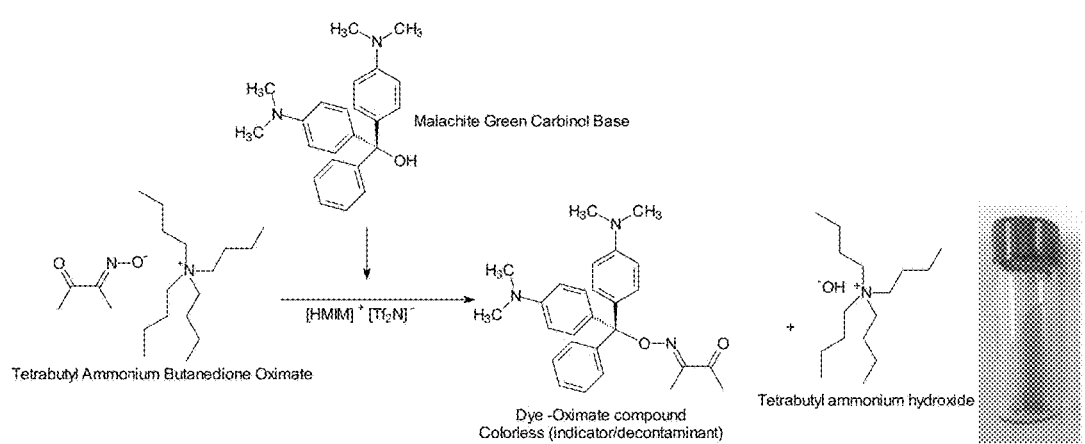
FIG. 2. Reaction of Malachite green carbinol base with tetrabutyl ammonium 2,3-butanedione monoximate to form an example of the triarylmethane dye-oximate compounds.
Figure 3:
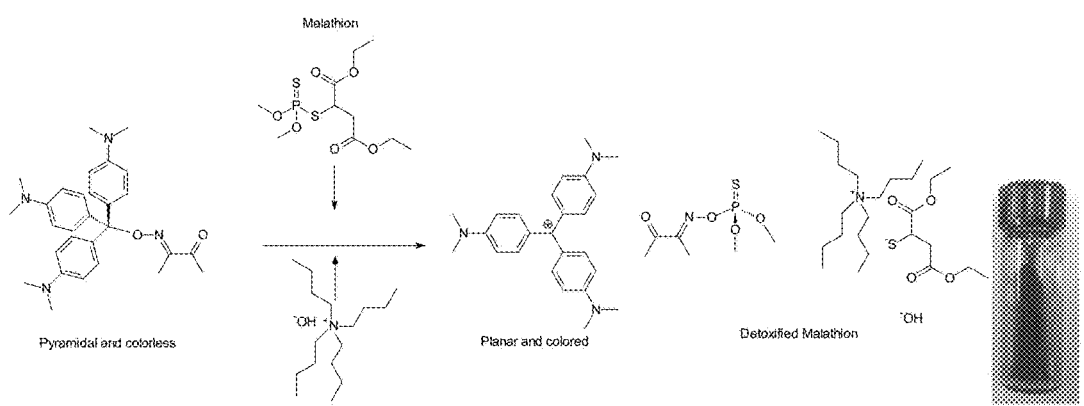
FIG. 3. Reaction of a Malachite green dye-oximate compound with malathion resulting in the production of the green-colored solution.
Figure 4:
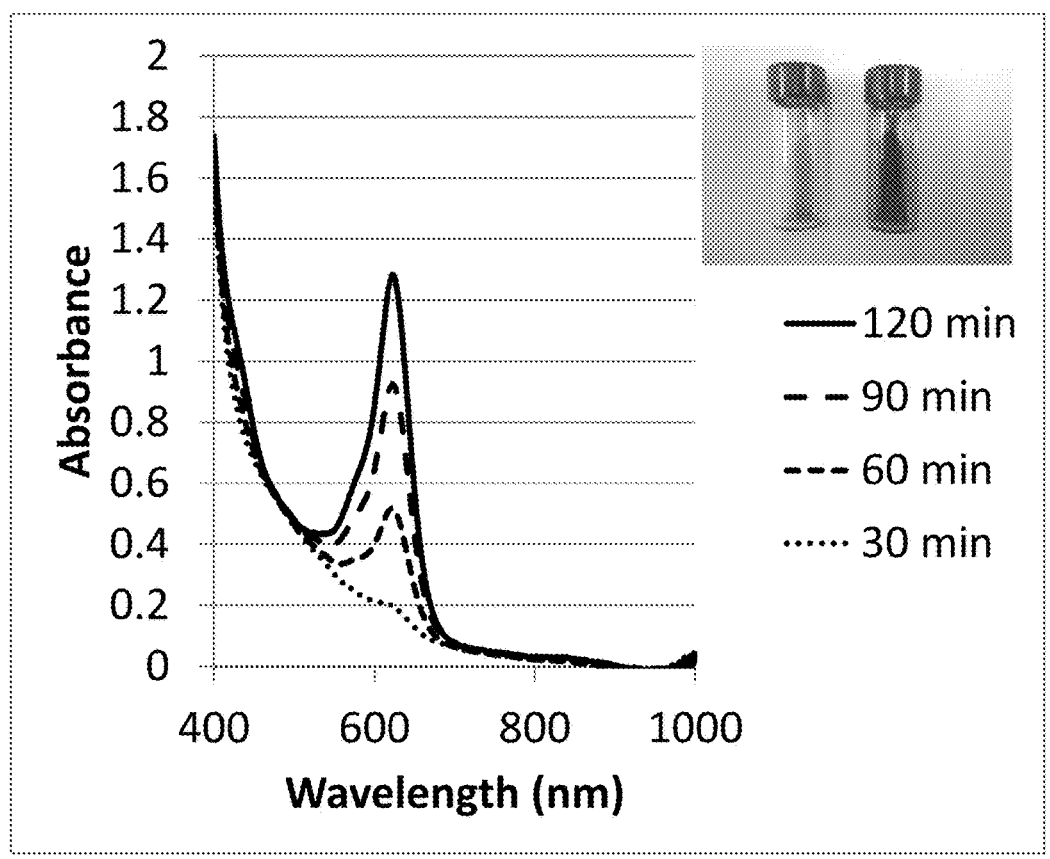
FIG. 4. Color development from Malachite green dye-oximate compound reacted with malathion in ionic liquid.

The summary of the invention above and in the Detailed Description of the Invention, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, and article "comprising" (or "which comprises") component A, B, and C can consist of (i.e. contain only) components A, B, and C, or can contain not only components A, B, and C but also one or more other components.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending on the variable being defined). For example, "at most 4" means 4 or less than 4, and "at most 40%" means 40% or less than 40%. When, in this specification, a range is given as "(a first number) to (a second number)" or "(a first number)-(a second number)", this means a range whose lower limit is the first number and whose upper limit is the second number. For example 25 to 100 mm means a range whose lower limit is 25 mm, and whose upper limit is 100 mm.

The triarylmethane dye-oximate compounds of this invention have the chemical structure in Formula 4 wherein, $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$ and $R_{15}$ each independent from one another are selected from the group consisting of —H, —N(Me)$_2$, —NH$_2$, —NH (Me), —SO$_3$Na, —SO$_3$, —CH$_3$, —OH, —N(C$_2$H$_5$)$_2$, —N(CH$_2$H$_5$)(CH$_2$C$_6$H$_4$SO$_3$) and bridged —C$_4$H$_4$—. (a fused aromatic ring across two R positions, for example Victoria blue). In particular embodiments the triarymethane dye may be methyl violet, crystal violet, methyl violet 2B, methyl violet 6B, methylviolet 10B, fuchsine, pararosaniline, basic red 9, new fuchsine, fuchsine acid, phenol red, malachite green, brilliant green, brilliant blue, Victoria blue B Victoria blue FBR, Victoria blue BO, Victoria blue FGA, Victoria blue 4 R, Victoria blue R or methyl blue.

Example 1 (Preparation of KBDO)

KDBO is made by the reaction of 2,3-butanedione monoxime with potassium tert-butoxide (scheme 5).

Scheme 5

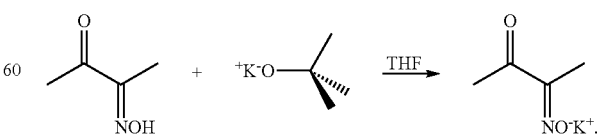

Although not wishing to be bound by theory, the mechanism for detoxification of agent VX by KBDO is shown in scheme 6.

Scheme 6

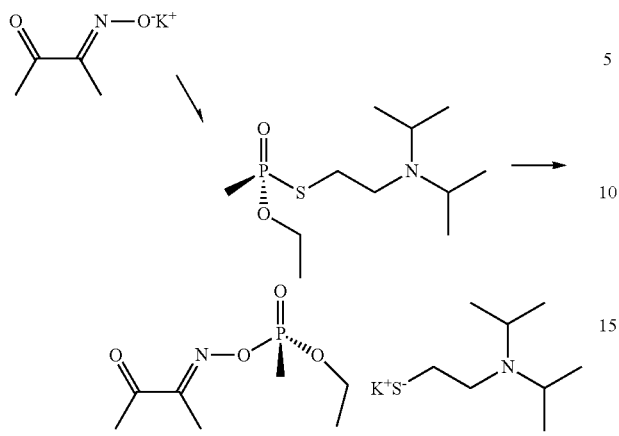

The dye-oximate compound of this invention is a 2,3-butanedione monoximate bonded to a triarylmethane dye. It can be synthesized in water, organic solvents, or ionic liquids.

Example 2 (Preparation of Tryarylmethane Dye-Oximate Compound in Water or Organic Solvent)

For preparation in water, an excess amount of KBDO is combined with a water soluble triarylmethane dye and allowed to react. The desired product is confirmed when the solution becomes colorless. The reaction of KBDO and triarylmethane dye can also be completed in an organic solvent.

Example 3 (Preparation of Tryarylmethane Dye-Oximate Compound in Room Temperature Ionic Liquid)

To make the dye-oximate compound in an ionic liquid the 2,3-butanedione monoxime must first be converted into tetrabutyl ammonium 2,3-butanedione monoximate, which is more soluble than KBDO in common room temperature ionic liquids.

Typical preparation of TetraBuylAmmonium ($TBA^+$) ButaneDione monOximate ($BDO^-$): Butanedione monoxime (1.9950 g; 19.7 mmol) was dissolved in ethanol (20 mL) in a 100 mL round-bottom flask. Next, a saturated solution of $TBA^+OH^-$ (~40%; 12.4171 g; 19.1 mmol; 0.97 equiv) was added to the mixture. The mixture became orange, and after stirring briefly, was concentrated to an orange oil in vacuo. Next, the oil was dissolved in methanol, transferred to another 100 mL round-bottom flask, and then heated to reflux on a steam bath. Toluene was slowly added, and the solution was refluxed until it became cloudy. On cooling to room temperature, the mixture separated into two solvent layers; the top layer was yellow, and the more voluminous bottom layer was orange. On standing for 2 days at room temperature, large orange prisms (crystals) formed in the bottom layer. These were collected, washed with toluene and then pentane, and dried in vacuo (1.2340 g; 18.8% yield). A second and larger crop was obtained by letting the supernatant stand and slowly evaporate over 4 d (3.1041 g; 47.3% yield).

Formula 5, TetraBuylAmmonium ($TBA^+$) ButaneDionemonOximate ($BDO^-$):

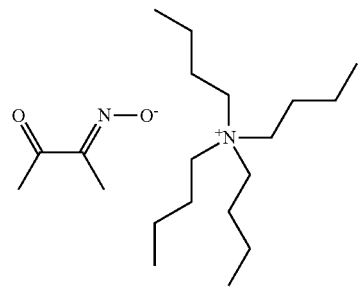

A blue-green dye compound had good solubility in the ionic liquid 1-hexyl-3-methylimidazolium bis(trifluoromethylsulfonyl)imide $[HMIM]^+$ $[Tf_2N]^-$. The compound formed by the reaction of BDO with the triarylmethane dye Malachite green carbinol base (MG) was prepared in the ionic liquid. This single compound acts as both a colorimetric indicator of CW agent contamination and a reactive decontaminant.

First, tetrabutylammonium butanedione monoximate ($TBA^+BDO^-$; 161.4 mg; 0.492 mmol) was added to a 15 mL vial along with a small magnetic stir bar. Next, the RTIL ($HMIM^+Tf_2N^-$; 4.41 g) was added, and the mixture was sonicated for 25 min. Then, Malachite green carbinol base (MG; 79.8 mg; 0.254 mmol) was added to the ionic liquid and allowed to react with the $TBA^+BDO^-$. The resulting product was pale yellow (not bright blue-green like the original malachite green).

Scheme 7 shows the preparation of a Malachite green dye—oximate compound in a room temperature ionic liquid.

Scheme 7

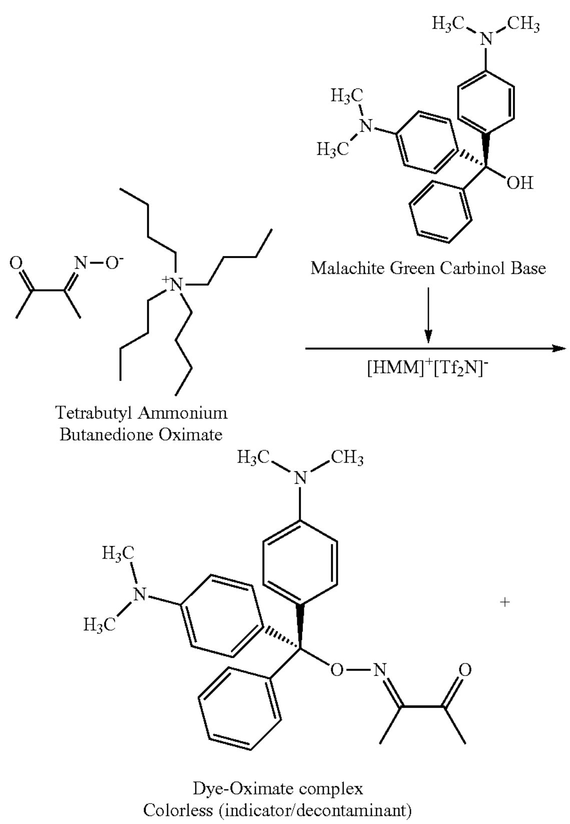

-continued

[Structure: Tetrabutyl ammonium hydroxide]

Tetrabutyl ammonium hydroxide

Example 4 (Testing the Dye-Oximate Compound Against an Organothio Phosphonate, Malathion, which is a Surrogate for Chemical Agent VX)

The indicator solution was tested against malathion. In these tests, a small portion of the RTIL solution of the indicator was added to a vial, followed by a few drops of the surrogate. The reaction with malathion occurred over 1-2 hours, producing a deep blue-green solution. The MG complex is soluble in the RTIL, and this test demonstrates that it can function as a colorimetric indicator for CW agent contamination.

Without wishing to be bound by theory, scheme 8 shows the reaction of the Malachite green dye-oximate compound with malathion.

Scheme 8

[Structures showing Pyramidal and colorless reactant + Malathion → Planar and colored product]

Pyramidal and colorless

Malathion

Planar and colored

-continued

[Structure: Detoxified VX]

Detoxified VX

Example 5 (Reaction Kinetics)

Figure 5:
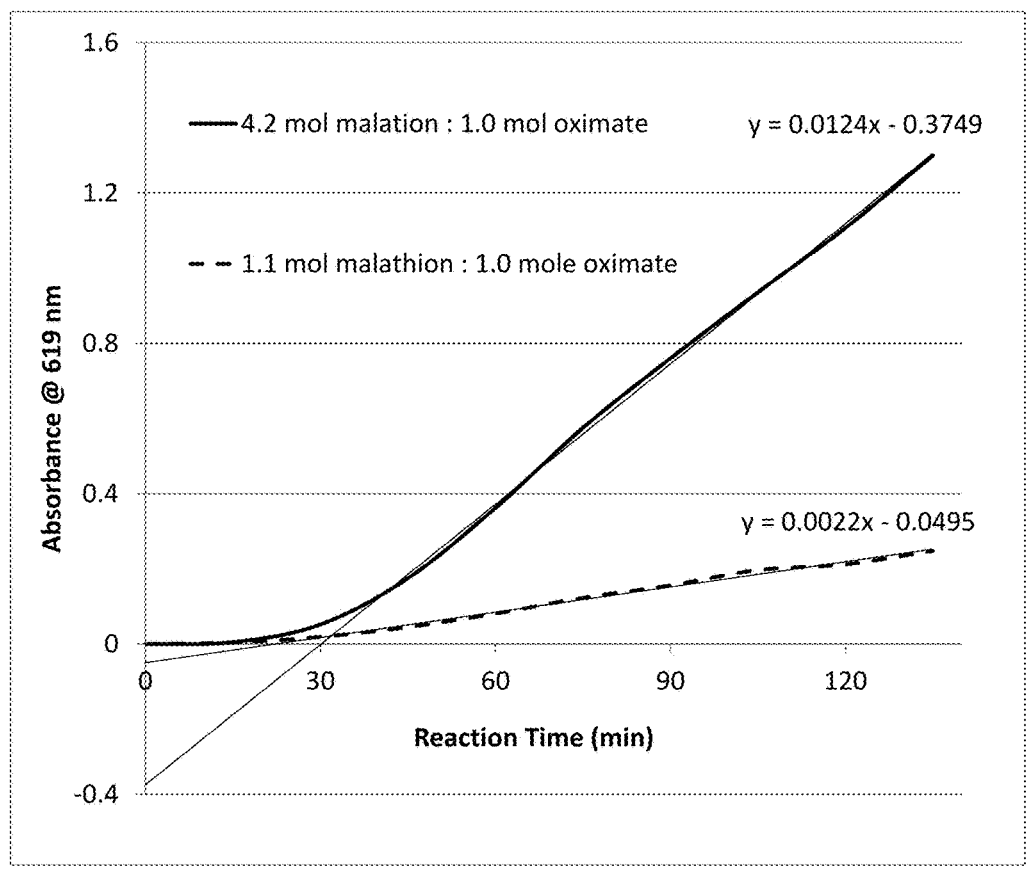
FIG. 5. Kinetics of the color development from Malachite green dye-oximate compound reacted with malathion in ionic liquid.

The kinetics for the reaction in Example 4 were further evaluated at two different concentrations. In one case, the oximate, dye, and malathion were close to equal-molar concentration. Specifically, the dye was used at 0.95 mol to 1.0 mol of the oximate. The 5% excess of the oximate was used to insure that the dye was fully bleached (colorless). Next, we added 1.05 mol of malathion to 1.0 mol oximate, to insure complete reaction of the oximate. In the graph in FIG. 5 the equimolar reaction is shown as the dashed line. When we increased the malathion to 4.2 mol malathion to 1.0 mol oximate, the reaction rate increased (observed at 6× increase; solid line on graph in FIG. 5). For both concentrations, there was an induction period of about 15 to 30 minutes. There was 0.05% excess free oximate which is more reactive and likely to be consumed prior to the start of the reaction of malathion with the dye-oximate compound. The data in FIG. 5 are following the light absorbance at 619 nm, the center of the peak for the Malachite green (free) dye.

Example 6 (Quantification of the Reaction of Malathion with Oximate)

Samples of the reaction products from Example 5 were analyzed by CG analysis: The feed solution had 13.4 mg malathion at the start in 2.88 g [HMIM]$^+$[Tf2N]$^-$ (RTIL density ~1.4 g/ml). Thus, 0.04 Molar malathion. The oximate was 0.0363 Molar. After 48 hours, 1.47 mg malathion was remaining, or 0.0044 Molar (11% of original). The 11% recovered malathion was expected, as there was 11% excess malathion compared to oximate in the starting reaction.

Results from the reaction studies for the excess (4×) malathion solution using CG analysis: The feed solution had 36.3 mg malathion at the start in 0.9614 g [HMIM]$^+$[Tf2N]$^-$ (RTIL density ~1.4 g/ml). Thus, 0.160 Molar malathion. The oximate was 0.038 Molar. After 24 hours, 25.0 mg malathion was remaining, or 0.110 Molar (69% of original). The 69% recovered malathion was close to the expected value of 76%, based on the 76% excess malathion compared to oximate.

Control tests (2:1 excess TBA-BDO:MG dye) in IL: In this test there is enough free oximate (not in the dye) to consume the malathion. This test demonstrates that the free oximate (TBA-BDO) reacts with malathion very quickly.

The feed contained 0.042 Molar malathion and 0.157 Molar oximate (of which 0.783 Molar is free TBA-BDO and 0.783 Molar is the oximate-MG complex). So there was enough free oximate to consume the malathion, and the malathion was completely consumed in 15 minutes, demonstrating that the free oximate is very quick to detoxify the CW agent stimulant, and the color development from the dye-oximate compound occurs after free oximate is first consumed.

Example 7

Without wishing to be bound by theory, scheme 9 shows the expected reaction of Malachite green dye-2,3-butane-dione oximate with agent VX.

Example 8

Without wishing to be bound by theory, scheme 10 shows the expected reaction of Malachite green dye-2,3-butane-dione oximate with agent GD.

Example 9 (Malachite Green Dye-Oximate Color Indicator for Live Agent GD and Agent VX)

Figure 6:
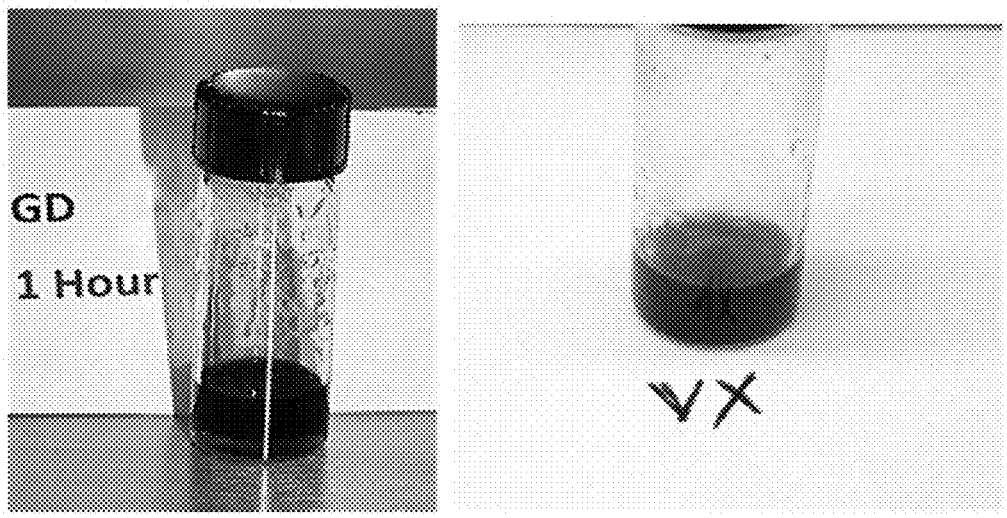
FIG. 6. Color development from Malachite green dye-oximate compound reacted with live agent GD and agent VX in ionic liquid.

A stock solution of ionic liquid and Malachite green dye-oximate compound was prepared from 4.22 grams of the ionic liquid [HMIM]$^+$[TF2N]$^-$ by first adding 38.0 mg of the TBO-BDO compound and then 35.2 mg of Malachite green carbinol base. The mixture was stirred until the dye completely bleached out yielding a pale yellow solution. 1 milliliter aliquots of this stock were each placed in vials for exposure to live chemical agents. (Live agent testing was performed at a United States surety facility). Approximately 50 mg of chemical agent was added to each aliquot. FIG. 6 shows the green color of these solutions after reaction with agent GD (after 1 hour) and agent VX (after 4 hours).

Although not wishing to be bound by the theory, additional embodiments of the invention include other triaryl-methane dyes (a non-limiting example is methyl blue). For example, the dye-oximate complex made from methyl blue and butanedione monoximate has the following chemical structure (formula 5):

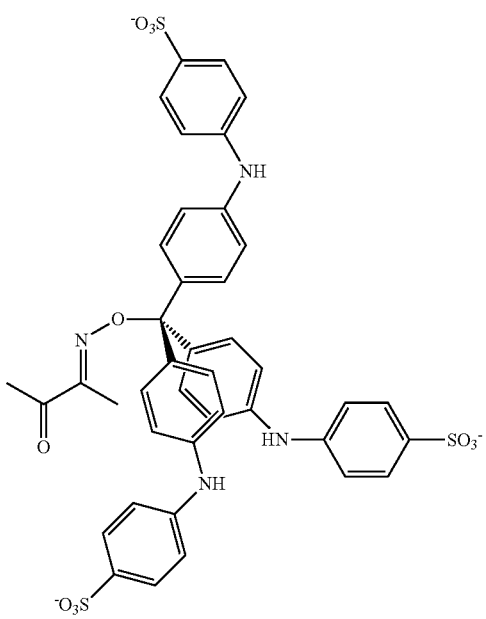

This compound can be made with the following procedure. First, tetrabutylammonium butanedione monoximate (TBA⁺BDO⁻; 67.3 mg; 0.205 mmol) and methyl blue (MB; 6.2 mg; 0.0078 mmol) are added to a 15 mL vial along with a small magnetic stir bar. Next, the RTIL (HMIM⁺Tf₂N⁻; 6.73 g) is added, and the mixture is sonicated for 25 min and then stirred overnight. The supernatant contains the dye-oximate compound of formula 5.

What is claimed is:

1. A triarylmethane dye-oximate compound having the chemical structure:

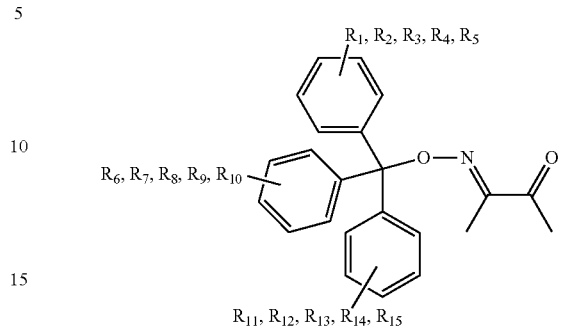

wherein, $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$ and $R_{15}$ each independent from one another are selected from the group consisting of —H, —N(Me)₂, —NH₂, —NH(Me), —SO₃Na, —SO₃, —CH₃, —OH, —N(C₂H₅)₂, —N(CH₂H₅)(CH₂C₆H₄SO₃) and —C₄H₄—, and wherein the triarylmethane dye is either methyl violet, crystal violet, fuchsine, pararosaniline, new fuchsine, fuchsine acid, phenol red, malachite green, brilliant green, brilliant blue, Victoria blue B Victoria blue FBR, Victoria blue BO, Victoria blue FGA, Victoria blue 4 R, Victoria blue R or methyl blue.

2. The triarylmethane dye-oximate compound of claim 1, wherein the triarylmethane dye is Malachite green.

* * * * *